(12) United States Patent
Yamasaki

(10) Patent No.: US 11,587,103 B2
(45) Date of Patent: Feb. 21, 2023

(54) OBJECT DETECTION SYSTEM USING IMAGE RECOGNITION, OBJECT DETECTION DEVICE USING IMAGE RECOGNITION, OBJECT DETECTION METHOD USING IMAGE RECOGNITION, AND NON-TRANSITORY STORAGE MEDIUM

(71) Applicant: NEC Corporation, Tokyo (JP)

(72) Inventor: Shinya Yamasaki, Tokyo (JP)

(73) Assignee: NEC CORPORATION, Tokyo (JP)

( * ) Notice: Subject to any disclaimer, the term of this patent is extended or adjusted under 35 U.S.C. 154(b) by 45 days.

(21) Appl. No.: 17/040,113

(22) PCT Filed: Oct. 18, 2018

(86) PCT No.: PCT/JP2018/038800
§ 371 (c)(1),
(2) Date: Sep. 22, 2020

(87) PCT Pub. No.: WO2019/181034
PCT Pub. Date: Sep. 26, 2019

(65) Prior Publication Data
US 2021/0019776 A1 Jan. 21, 2021

(30) Foreign Application Priority Data
Mar. 22, 2018 (JP) .............................. JP2018-054101

(51) Int. Cl.
*G06F 3/0482* (2013.01)
*G06F 3/0488* (2022.01)
(Continued)

(52) U.S. Cl.
CPC ....... *G06Q 30/0207* (2013.01); *G06F 3/0482* (2013.01); *G06F 3/0488* (2013.01); *G06V 20/20* (2022.01); *G07G 1/12* (2013.01)

(58) Field of Classification Search
CPC ....... G06F 3/0482; G06F 3/0488; G07G 1/12; G06K 9/00671
See application file for complete search history.

(56) References Cited

U.S. PATENT DOCUMENTS 7,298,264 B1 * 11/2007 Kuzma ................ G06Q 10/087
235/375
2005/0189412 A1 * 9/2005 Hudnut ................ G07G 1/0081
235/383
(Continued)

FOREIGN PATENT DOCUMENTS

EP   3 118 793        1/2017
JP   2016-110538 A    6/2016
(Continued)

OTHER PUBLICATIONS

International Search Report corresponding to PCT/JP2018/038800, dated Nov. 27, 2018 (3 pages).

*Primary Examiner* — Nhat Huy T Nguyen

(57) ABSTRACT

The present invention provides a registration system (10) including a recognition unit (11) that analyzes an image obtained by a camera imaging a placing surface of a table on which a product is placed and recognizes the product in the image, a registration unit (12) that registers the recognized product as a checkout target, a first display unit (13) that displays a list of the products registered as the checkout targets on a display, a first selection unit (14) that selects one or more of the products from the list, and a second display unit (15) that displays information for determining the selected product, on the placing surface.

12 Claims, 12 Drawing Sheets

(51) Int. Cl.
*G06Q 30/02* (2012.01)
*G06Q 30/0207* (2023.01)
*G07G 1/12* (2006.01)
*G06V 20/20* (2022.01)

(56) References Cited

U.S. PATENT DOCUMENTS

| | | | |
|---|---|---|---|
| 2009/0222337 A1* | 9/2009 | Sergiades | G06Q 30/0239 |
| | | | 705/14.23 |
| 2015/0242833 A1* | 8/2015 | Itani | G07G 1/01 |
| | | | 705/23 |
| 2015/0309578 A1* | 10/2015 | McCoy | G06F 3/0484 |
| | | | 715/863 |
| 2015/0310414 A1 | 10/2015 | Itani et al. | |
| 2017/0017944 A1* | 1/2017 | Sasahara | G06Q 20/201 |
| 2018/0232796 A1* | 8/2018 | Glaser | G06Q 30/0635 |

FOREIGN PATENT DOCUMENTS

| | | |
|---|---|---|
| JP | 2017-220206 A | 12/2017 |
| WO | WO-2014-020948 A1 | 2/2014 |
| WO | WO-2017-126253 A1 | 7/2017 |

* cited by examiner

FIG. 4

| No. | PRODUCT NAME | UNIT PRICE | QUANTITY | TOTAL AMOUNT |
|---|---|---|---|---|
| 1 | SHOWA CHOCOLATE BAR | 127 | 1 | 127 |
| 2 | SODA DRINK (LIME FLAVOR) | 117 | 2 | 234 |
|   |   |   |   |   |
|   |   |   |   |   |

STOP (CANCEL)  TOTAL (SETTLEMENT)

| No. | PRODUCT NAME | PRICE | QUANTITY | TOTAL AMOUNT |
|---|---|---|---|---|
| 1 | SHOWA CHOCOLATE BAR | 127 | 1 | 127 |
| 2 | SODA DRINK (LIME FLAVOR) | 117 | 2 | 234 |
|   |   |   |   |   |
|   |   |   |   |   |

STOP (CANCEL) | TOTAL (SETTLEMENT)

PLEASE, SELECT PROCESSING CONTENT.

DELETE | CHANGE QUANTITY
CHANGE PRODUCT NAME | DISCOUNT PROCESS

NEXT ▷

| No. | PRODUCT NAME | PRICE | QUANTITY | TOTAL AMOUNT |
|---|---|---|---|---|
| 1 | SHOWA CHOCOLATE BAR | 127 | 1 | 127 |
| 2 | SODA DRINK (LIME FLAVOR) | 117 | 2 | 234 |
|  |  |  |  |  |
|  |  |  |  |  |

STOP (CANCEL)    TOTAL (SETTLEMENT)

PLEASE, SELECT PROCESSING CONTENT.

DELETE    CHANGE QUANTITY

CHANGE PRODUCT NAME    DISCOUNT PROCESS

NEXT ▷

~ 7

OBJECT DETECTION SYSTEM USING IMAGE RECOGNITION, OBJECT DETECTION DEVICE USING IMAGE RECOGNITION, OBJECT DETECTION METHOD USING IMAGE RECOGNITION, AND NON-TRANSITORY STORAGE MEDIUM

CROSS-REFERENCE TO RELATED APPLICATIONS

This application is a national stage application of International Application No. PCT/JP2018/038800 entitled, "REGISTRATION SYSTEM, REGISTRATION METHOD, AND PROGRAM," filed on Oct. 18, 2018, which claims priority to Japanese Patent Application No. 2018-054101, filed on Mar. 22, 2018. The entire contents of these applications are incorporated herein by reference in their entirety.

TECHNICAL FIELD

Non-limiting embodiments relate to an object detection system using image recognition, an objection detection device using image recognition, an objection detection method using image recognition, and a non-transitory storage medium.

BACKGROUND ART

A technology of recognizing a product with image analysis and registering the product as a checkout target is examined.

An apparatus may execute a process of analyzing an image obtained by imaging a product on a belt conveyor to recognize the product, and then display a product candidate on a display in a case where a reliability is within a predetermined range and lights up a display lamp when the product moves to the vicinity of a terminal, and register a product specified from the product candidates as a checkout target.

An apparatus may image a product placed on a table with a camera, recognize the product by pattern matching based on a feature value of an appearance of the product, and register the recognized product as a checkout target.

An apparatus may image a product placed on a table with a camera, recognize the product by pattern matching based on a feature value of an appearance of the product, and register the recognized product as a checkout target. The apparatus may project a predetermined mark on a placement position of the recognized product.

SUMMARY

Technical Problem

In a case where information on checkout is displayed on both the placement position of the product and a display of an operation terminal, work efficiency of a checkout process is improved by appropriately controlling the display content.

Solution to Problem

An object of the present invention is to appropriately control information on checkout displayed on both a placement position of a product and a display of an operation terminal, and improve work efficiency of a checkout process.

Solution to Problem

According to some non-limiting embodiments, there is provided a recognition system including a recognition unit that analyzes an image obtained by a camera imaging a placing surface of a table on which a product is placed and recognizes the product in the image; a registration unit that registers the recognized product as a checkout target; a first display unit that displays a list of the products registered as the checkout targets on a display; a first selection unit that selects one or more of the products from the list; and a second display unit that displays information for determining the selected product, on the placing surface.

In addition, according to some non-limiting embodiments, there is provided a registration method executed by a computer, the method including: a recognition step of analyzing an image obtained by a camera imaging a placing surface of a table on which a product is placed and recognizing the product in the image; a registration step of registering the recognized product as a checkout target; a first display step of displaying a list of the products registered as the checkout targets on a display; a first selection step of selecting one or more of the products from the list; and a second display step of displaying information for determining the selected product, on the placing surface.

In addition, according to some non-limiting embodiments, there is provided a program causing a computer to function as: a recognition unit that analyzes an image obtained by a camera imaging a placing surface of a table on which a product is placed and recognizes the product in the image; a registration unit that registers the recognized product as a checkout target; a first display unit that displays a list of the products registered as the checkout targets on a display; a first selection unit that selects one or more of the products from the list; and a second display unit that displays information for determining the selected product, on the placing surface.

Advantageous Effects

According to some non-limiting embodiments, it is possible to improve the work efficiency of a checkout process by appropriately controlling information on checkout displayed on both a placement position of a product and a display of an operation terminal.

BRIEF DESCRIPTION OF THE DRAWINGS

The above objects and other objects, features and advantages will become more apparent from the following description of the preferred example embodiments and the accompanying drawings.

FIG. 4 is a diagram schematically illustrating an example of information output to a first display 7 by the registration system 10 according to the present example embodiment.

FIG. 6 is a diagram schematically illustrating another example of the information output to the first display 7 by the registration system 10 according to the present example embodiment.

FIG. 10 is a diagram schematically illustrating still another example of the information output to the first display 7 by the registration system 10 according to the present example embodiment.

DESCRIPTION OF EMBODIMENTS

First Example Embodiment

First, a hardware configuration example and an outline of a process of a registration system according to the present example embodiment will be described.

Figure 1:
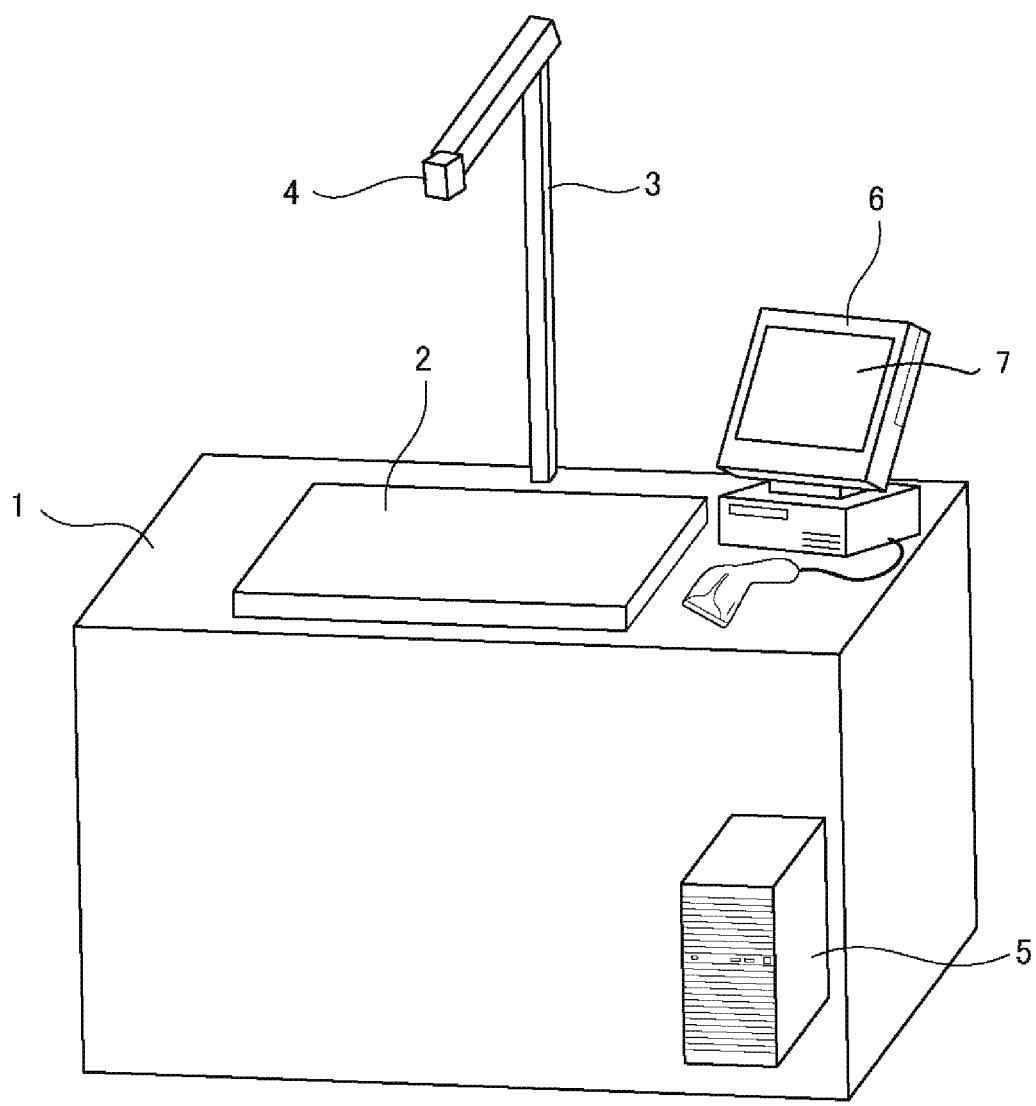
FIG. 1 is a diagram illustrating a hardware configuration example of a registration system 10 according to the present example embodiment.

As illustrated in FIG. 1, the registration system includes a placing table 1, the second display 2, an operation terminal 6 having the first display 7, a computer 5, and a camera 4. In the illustrated example, the camera 4 is attached to a column 3. Note that, the illustrated configuration example is merely an example, and the example embodiment is not limited to this.

The camera 4 and the computer 5 are configured to be able to communicate with each other in a wired and/or wireless manner. In addition, the computer 5 and the operation terminal 6 are configured to be able to communicate with each other in a wired and/or wireless manner. Further, the second display 2 and the computer 5 are configured to be able to communicate with each other in a wired and/or wireless manner.

The second display 2 constitutes a part of the placing table 1 and displays various types of information. One or a plurality of products to be checked out are placed on the placing table 1, more specifically on the second display 2. The camera 4 is installed at a position at which the second display 2 is imaged from above. An image generated by the camera 4 is transmitted to the computer 5. The computer 5 analyzes the image, detects an object existing in the image, and recognizes which product the detected object is. The recognized product is registered as a checkout target. A list of the product registered as the checkout target is displayed on the first display 7 of the operation terminal 6.

The operation terminal 6 receives an input for selecting one or a plurality of ones from the list of the products registered as checkout targets. For example, when a user changes registered contents (changing a product name, changing a quantity, discounting, and the like), the user selects the product to be processed from the list. In response to this input, the computer 5 displays information for determining the selected product on the second display 2. For example, a predetermined mark is displayed at a placement position of the selected product.

The registration system 10 according to the present example embodiment displays, when one or a plurality of ones are selected from the list of the products displayed on the first display 7, information for determining the selected product is displayed on the second display 2. In this manner, by appropriately interlocking the contents displayed on a plurality of displays (the first display 7 and the second display 2), the user can easily recognize his/her input contents (which product is selected) and the like. As a result, work efficiency of a checkout process is improved.

Figure 2:
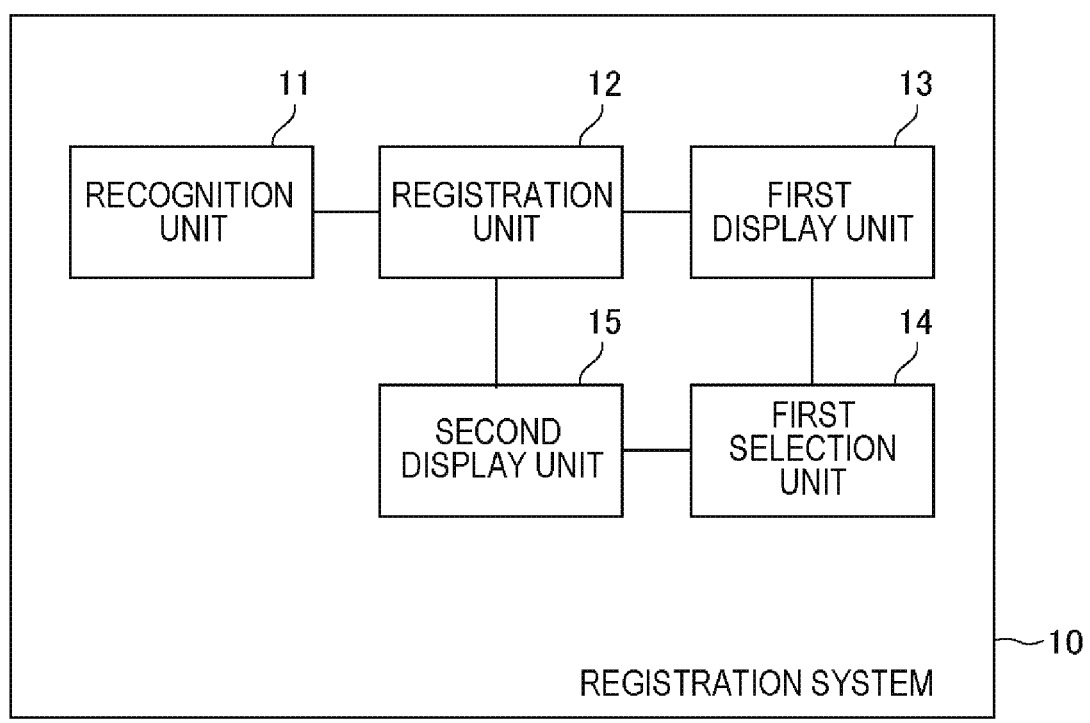
FIG. 2 is a diagram illustrating an example of a functional block diagram of the registration system 10 according to the present example embodiment.

Hereinafter, a configuration of the registration system 10 according to the present example embodiment will be described in detail. FIG. 2 illustrates an example of a functional block diagram of the registration system 10 according to the present example embodiment. As illustrated, the registration system 10 includes a recognition unit 11, a registration unit 12, a first display unit 13, a first selection unit 14, and a second display unit 15. The registration system 10 may be constituted by a plurality of apparatuses physically and/or logically separated, or may be constituted physically and/or logically by one apparatus. In a case of being constituted by the plurality of physically and/or logically separated apparatuses, the plurality of apparatuses are configured to be able to communicate with each other in a wired and/or wireless manner.

Each functional unit included in the registration system 10 is realized by any combination of hardware and software of any computer based on a central processing unit (CPU), a memory, a program loaded in the memory, a storage unit (in addition to the program stored from a stage of shipping the apparatus in advance, a program downloaded from a storage medium such as a compact disc (CD) or a server on the internet) such as a hard disc storing the program, and a network connection interface. Those skilled in the art understand that there are various modification examples to a realization method thereof and the apparatus.

Figure 3:
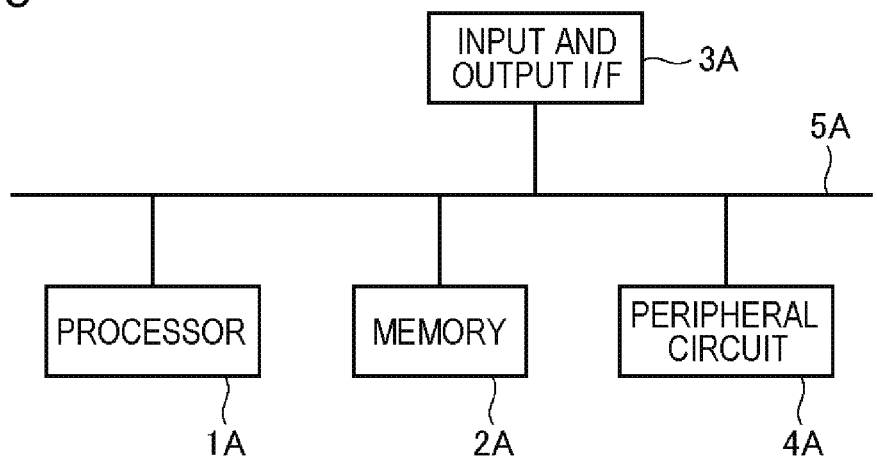
FIG. 3 is a diagram illustrating an example of a hardware configuration of a computer 5 according to the present example embodiment.

FIG. 3 is a block diagram illustrating a hardware configuration of the computer 5. As illustrated in FIG. 3, the computer 5 has a processor 1A, a memory 2A, an input and output interface 3A, a peripheral circuit 4A, and a bus 5A. The peripheral circuit 4A includes various modules. The peripheral circuit 4A may not be provided. Note that, in a case where the computer 5 is constituted by a plurality of physically and/or logically separated apparatuses, each apparatus can have the hardware configuration.

The bus 5A is a data transmission line through which the processor 1A, the memory 2A, the peripheral circuit 4A and, the input and output interface 3A transmit and receive data to and from one another. The processor 1A is an arithmetic processing unit such as a central processing unit (CPU) or a graphics processing unit (GPU). The memory 2A is a memory such as a random access memory (RAM) or a read only memory (ROM), for example. The input and output interface 3A includes an interface for acquiring information from an input apparatus (for example, a keyboard, a mouse, a microphone, a camera, or the like), an external apparatus, an external server, an external sensor, and the like and an interface for outputting the information from an output apparatus (for example, a display, a speaker, a printer, an emailer, or the like), the external apparatus, the external server, and the like. The processor 1A can output a command to each module and perform arithmetic based on the operation result.

Returning to FIG. 2, a functional configuration of each functional unit will be described.

The recognition unit 11 analyzes an image obtained by imaging a placing surface of a table on which a product is placed with a camera, and recognizes the product in the image. The recognition unit 11 analyzes an image obtained by imaging a display surface (a surface on which information is displayed) of the second display 2 illustrated in FIG. 1 with the camera 4.

For example, the recognition unit 11 can detect an area in which an object exists, by performing binarization, a contour extraction process, and the like on the image. Further, the recognition unit 11 can determine a position in an image of each detected object. The position in the image is indicated with a two-dimensional coordinate system (hereinafter, an "image coordinate system") having any point as an origin and any directions as an x-axis and a y-axis in the image.

The recognition unit 11 collates an appearance feature (a feature of an area in which the object exists in the image) appearing in the image of the detected object with an appearance feature of each of a plurality of pre-registered products (reference information) to determine which product the object is (product recognition). Examples of the appearance feature of the product include colors, surface irregularities, shapes, and the like, but the example embodiment is not limited to this.

For example, the recognition unit 11 computes a similarity with the detected object, for each product for which the appearance feature is registered. Based on the computed similarity, it is determined that which product each object is.

In a case where there is one product having the similarity satisfying a condition (for example, a first reference value or more), the recognition unit 11 can output a recognition result that the object is the product. On the other hand, in a case where there is no product having the similarity satisfying the condition (for example, the first reference value or more), or there are a plurality of products having the similarity satisfying the condition (for example, the first reference value or more), the recognition unit 11 can output a recognition result that "the object cannot be recognized". Note that, details of the process of determining which product each object is based on the computed similarity are not limited to the example here.

The registration unit 12 registers the product recognized by the recognition unit 11 as a checkout target. For example, the registration unit 12 acquires product information (for example, a price, a product name, and the like) of the product recognized by the recognition unit 11 from a product master, and registers the product information.

The first display unit 13 displays a list of products registered as checkout targets (hereinafter, "registered product list") on the display. The first display unit 13 displays the registered product list on the first display 7 in FIG. 1. FIG. 4 illustrates an example of the registered product list displayed on the first display 7. In a case of the illustrated example, "Showa chocolate bar" and "soda drink (lime flavor)" are registered as checkout targets.

The second display unit 15 displays various types of information on the second display 2 constituting the placing surface of the placing table 1.

For example, the second display unit 15 can display information indicating a product (for example, a product recognized by the recognition unit 11) registered as a checkout target, on the second display 2. In addition, the second display unit 15 can display information indicating a product which is not registered as the checkout target (for example, a product which is not recognized by the recognition unit 11), on the second display 2.

Figure 5:
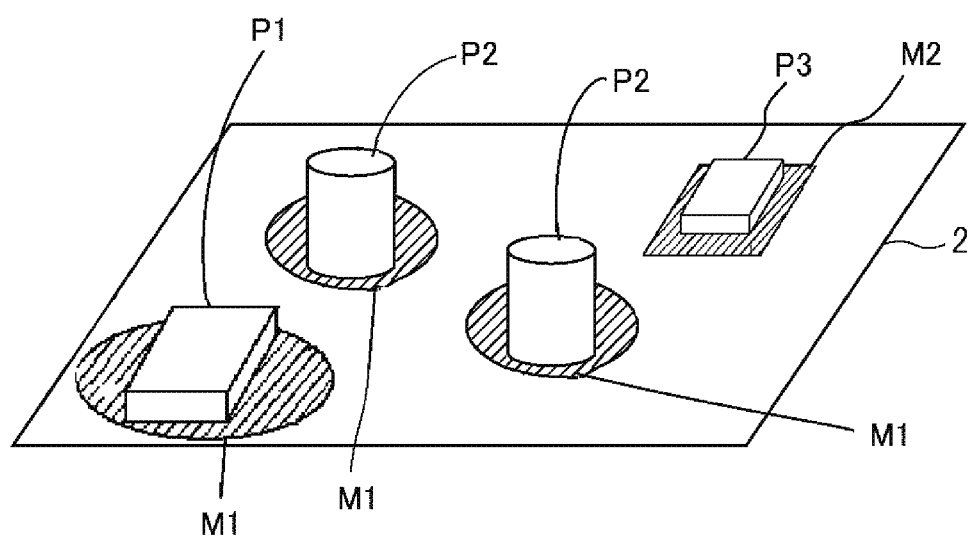
FIG. 5 is a diagram schematically illustrating an example of information output to a second display 2 by the registration system 10 according to the present example embodiment.

FIG. 5 schematically illustrates an example of information displayed on the second display 2 by the second display unit 15. In the illustrated example, a mark M1 is displayed at a placement position of the product registered as the checkout target (for example, the product recognized by the recognition unit 11). Further, a mark M2 is displayed at a placement position of the product which is not registered as the checkout target (for example, the product which is not recognized by the recognition unit 11). A product P1 in FIG. 5 corresponds to "Showa chocolate bar" in FIG. 4, and products P2 in FIG. 5 correspond to "soda drink (lime flavor)" in FIG. 4.

The second display unit 15 holds in advance a conversion rule for converting "coordinates in the image coordinate system" into "coordinates in a coordinate system of the second display 2". The "coordinates of the image coordinate system" are represented by a coordinate system in which any position is defined as an origin and any directions are defined as an x-axis direction and a y-axis direction in the image. The "coordinates of the coordinate system of the second display 2" are represented by a coordinate system in which any position is defined as an origin and any directions are defined as an x-axis direction and a y-axis direction within a display area of the second display 2.

The second display unit 15 converts coordinates of the image coordinate system of each object detected by the recognition unit 11 into the coordinates of the coordinate system of the second display 2, based on the conversion rule. The second display unit 15 displays various types of information (the marks M1 and M2, and the like) so as to surround coordinates of the coordinate system of the second display 2 obtained by the conversion or be close to the coordinates.

Note that, the displayed information may be other information such as characters, numbers, and symbols. Further, in the illustrated example, the information is displayed so as to include the placement position of the product, but the information may be displayed near the placement position. Further, the mark M1 and the mark M2 are distinguished from each other by a difference in shape, but the mark M1 and the mark M2 may be distinguished from each other by a difference in other display form such as a difference in color and a difference in shade.

Returning to FIG. 2, the first selection unit 14 selects one or more products from the registered product list based on a first selection input by the user. The first selection input according to the present example embodiment is an input for selecting one or more products from the registered product list. The first selection input is realized via any input apparatus such as a touch panel display, a physical button, and a microphone. For example, the first display 7 illustrated in FIG. 1 is a touch panel display, and the one or more products may be selected by a touch operation on the registered product list illustrated in FIG. 4 (for example, a touch operation on an area in which product information on the product to be selected is displayed). In addition, the one or more products may be selected by receiving an input of specifying a serial number indicated in the registered product list via a physical button, a microphone, or the like.

Based on the first selection input, the first display unit 13 can switch display contents on the first display 7, as illustrated in FIG. 6. The first display unit 13 displays the product selected in the first selection input (in a case of FIG. 6, "Showa chocolate bar") so as to be distinguished from other products (unselected products). In FIG. 6, an item of "No." of "Showa chocolate bar" is highlighted.

Figure 7:
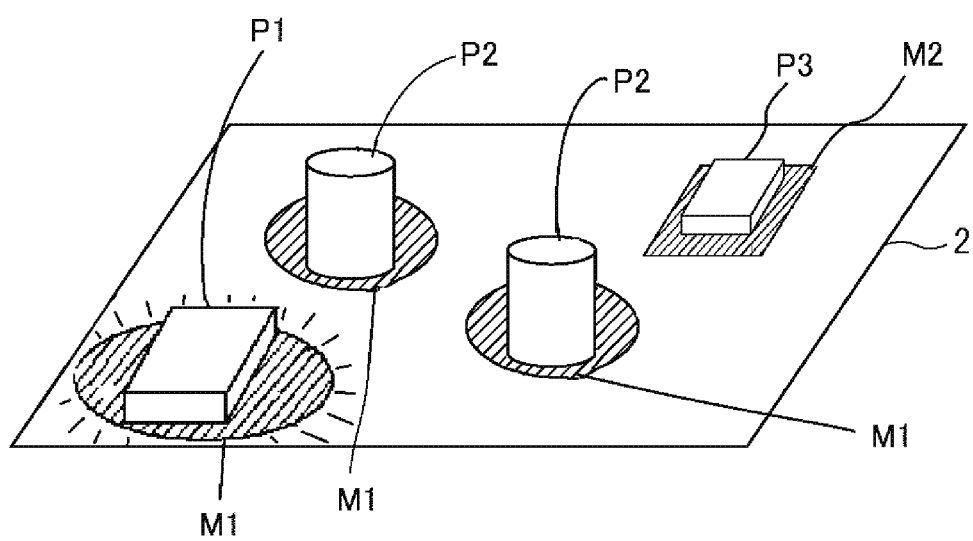
FIG. 7 is a diagram schematically illustrating another example of the information output to the second display 2 by the registration system 10 according to the present example embodiment.

Further, the second display unit 15 can switch the display content on the second display 2 based on the first selection input, as illustrated in FIG. 7. In the illustrated example, the second display unit 15 displays information (the blinking mark M1) which determines the product selected by the first selection input, on the second display 2.

In this manner, not only the display content of the first display 7 but also the display content of the second display 2 can be switched according to the touch operation on the first display 7. The user can recognize the product currently selected (the operation content of the user) not only from the touch-operated display content of the first display 7 but also from the display content of the second display 2.

Further, the display enables the user to recognize a correspondence relationship between a product name in the product list displayed on the first display 7 and a product placed on the second display 2. From the display contents of FIGS. 6 and 7, it can be seen that the product P1 illustrated in FIG. 7 is recognized as "Showa chocolate bar" illustrated in FIG. 6, and is registered as a product.

Note that, as illustrated in FIG. 6, the first display unit 13 can selectively display a list of processing contents to be executed for the selected product on the first display 7 in response to the first selection input. In the illustrated example, "delete", "change quantity", "change product name", and "discount process" are displayed. The first selection unit 14 can receive an input for selecting one from a list of the processing contents.

When the "delete" is selected, the registration unit 12 deletes the product selected by the first selection input from the checkout target. As a result, the product is deleted from the registered product list. For example, as illustrated in FIG. 6, when the "delete" is selected in a state in which the "Showa chocolate bar" is selected, the registration unit 12 deletes "Showa chocolate bar" from the checkout target. The first display unit 13 deletes "Showa chocolate bar" from the registered product list illustrated in FIG. 6.

When the "change quantity" is selected, the first display unit 13 displays information for selecting a changed quantity on the first display 7. The first selection unit 14 receives an input of selecting any quantity. The registration unit 12 changes the "quantity" of the product selected by the first selection input to the quantity selected in the above process.

For example, as illustrated in FIG. 6, if the "change quantity" is selected and "2" is further selected in a state in which the "Showa chocolate bar" is selected, the registration unit 12 changes the quantity of "Showa chocolate bar" registered as the checkout target to "2". The first display unit 13 changes the quantity of "Showa chocolate bar" in the registered product list illustrated in FIG. 6 to "2".

When the "change product name" is selected, the first display unit 13 displays information for selecting a changed product name on the first display 7. For example, the first display unit 13 may display a list of names of products having a similarity equal to or higher than a reference value in the product recognition by the recognition unit 11 as possible product names to be changed to (change candidates). The first selection unit 14 receives an input for selecting any product name from the change candidates. The registration unit 12 changes the "product name" of the product selected by the first selection input to the product name selected by the above process. In addition, product information (a unit price, and the like) of the product name after the change is acquired from the product master and registered.

For example, as illustrated in FIG. 6, the "change product name" is selected in a state in which the "Showa chocolate bar" is selected, and "Showa chocolate bar (limited model)" is further selected from the change candidates, the registration unit 12 deletes "Showa chocolate bar" from the checkout target and newly adds "Showa chocolate bar (limited model)". The first display unit 13 deletes "Showa chocolate bar" in the registered product list illustrated in FIG. 6 and newly adds "Showa chocolate bar (limited model)".

When the "discount process" is selected, the first display unit 13 displays information for selecting a discount content (for example, "discount by 30 yen", "discount by 30%", and the like) on the first display 7. The first selection unit 14 receives an input for selecting any discount content. The registration unit 12 changes a "unit price" of the product selected by the first selection input to a unit price which reflects the discount content selected in the above process.

For example, as illustrated in FIG. 6, when the "discount process" is selected and "discount by 30 yen" is further selected in a state in which the "Showa chocolate bar" selected, the registration unit 12 changes the unit price of "Showa chocolate bar" registered as the checkout target, from the original unit price of "127 yen" to "97 yen" after discounting by 30 yen. The first display unit 13 changes the unit price of "Showa chocolate bar" in the registered product list illustrated in FIG. 6 to "97 yen".

Figure 8:
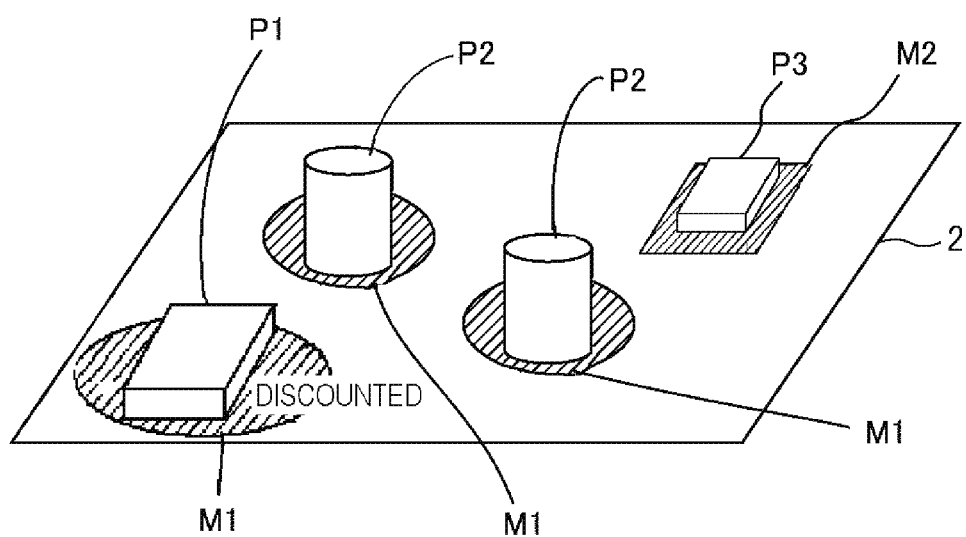
FIG. 8 is a diagram schematically illustrating still another example of the information output to the second display 2 by the registration system 10 according to the present example embodiment.

Note that, the second display unit 15 may display information indicating the discounting-processed products, on the second display 2, as illustrated in FIG. 8. In a case of the example illustrated in FIG. 8, the discounting-processed product is the product P1, and a text of "discounted" is displayed near a placement position of the product P1. According to the display, the user can recognize that the discounting process is certainly performed on a product to be discounted, based on the display content of the second display 2.

Next, an example of a flow of a process of the registration system 10 according to the present example embodiment will be described with reference to the flowcharts in FIG. 9.

The user places a product as a checkout target, for example, on the second display 2 in FIG. 1. The product placed on the second display 2 is imaged by the camera 4. An image generated by the camera 4 is transmitted to the computer 5.

When acquiring an image generated by the camera 4 (S10), the recognition unit 11 performs binarization, a contour extraction process, and the like on the image and detects an area in which an object exists to detect one or a plurality of objects in the image (S11). Next, the recognition unit 11 recognizes which product each of the one or the plurality of objects detected in S11 is (S12). Specifically, the recognition unit 11 collates an appearance feature (a feature of an area in which the object in the image exists) appearing in the image of the detected object with an appearance feature of each of a plurality of pre-registered products (reference information) to determine which product the object is.

In S13, the registration unit 12 acquires product information (for example, a price, a product name, and the like) of the product recognized in S12 from the product master, and registers the product information as a checkout target. Further, the first display unit 13 displays a list of products registered as checkout targets (registered product list) on the first display 7, as illustrated in FIG. 4. Further, as illustrated in FIG. 5, the second display unit 15 can display information (the mark M1 in FIG. 5) indicating a product (an object recognized as a product in S12) registered as a checkout target and information (the mark M2 in FIG. 5) indicating a product (an object not recognized as a product in S12) which is not registered as the checkout target on the second display 2.

After the registered product list including at least one product is displayed, the first selection unit 14 can receive a first selection input for selecting one or more products from the registered product list. When the first selection input is received (Yes in S14), the second display unit 15 displays information for determining the product selected by the first selection input (for example, the blinking mark M1) as illustrated in FIG. 7 on the second display 2 (S15). Further, as illustrated in FIG. 6, the first display unit 13 can display the product selected by the first selection input (in a case of FIG. 6, "Showa chocolate bar") so as to be distinguished from other products (unselected products).

Figure 9:
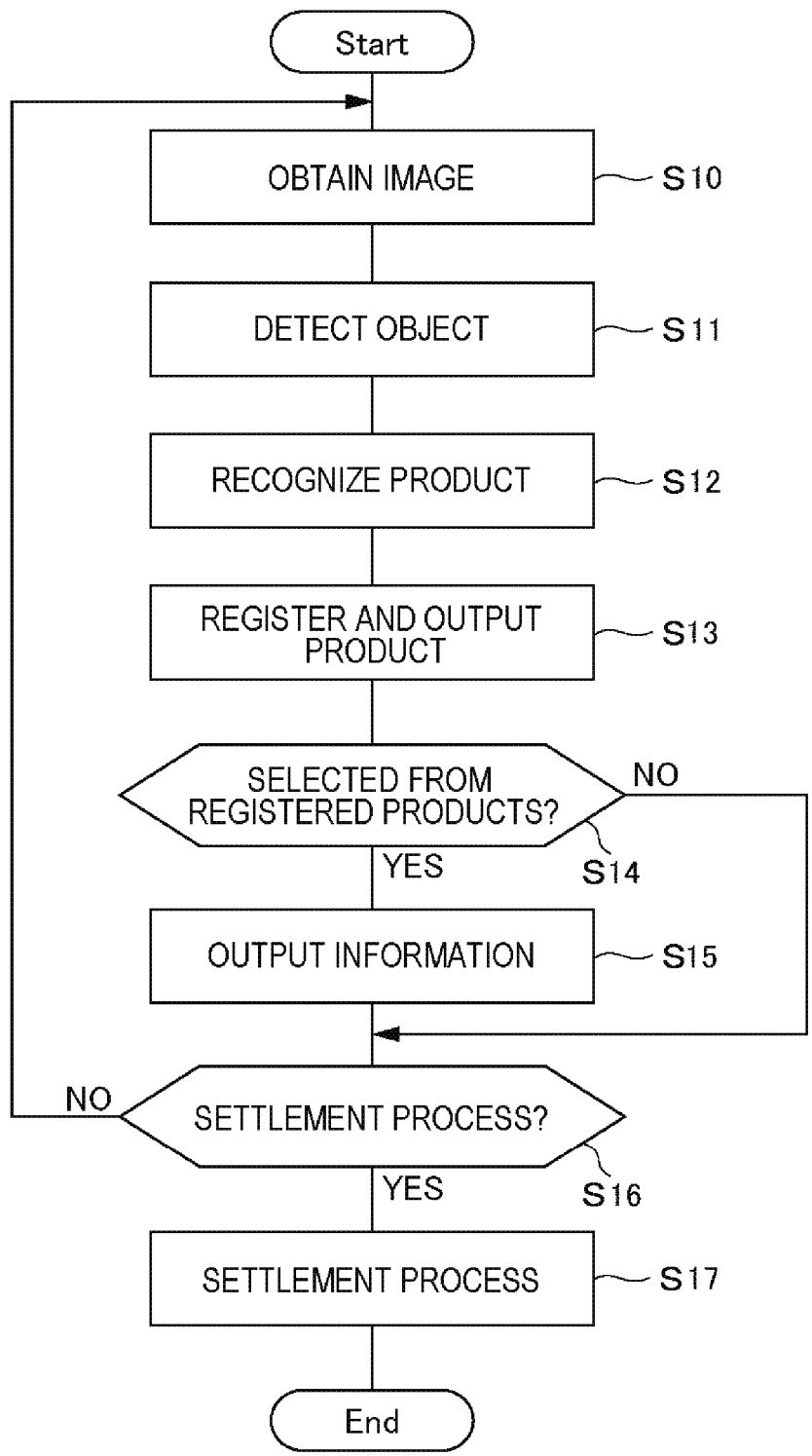
FIG. 9 is a flowchart illustrating an example of a flow of a process of the registration system 10 according to the present example embodiment.

Although not illustrated in the flowchart in FIG. 9, thereafter, various processes ("delete", "change quantity", "change product name", "discount process", and the like) may be executed on the product selected by the first selection input based on a user input.

When there is no input to start a settlement process (No in S16), the process returns to S10 and the same process is repeated. Note that, based on, for example, a time-series change of the image, the recognition unit 11 can distinguish an object newly placed on the second display 2 from an object which is still placed on the second display 2. When the new object is detected, the registration unit 12 registers the new product as a checkout target, based on a recognition result for the object in S12.

When there is the input to start the settlement process (Yes in S16), the registration system 10 performs the settlement process. For example, the registration system 10 may receive an input of cash as payment of a total payment amount computed based on the registered product, and may output a change or a receipt as necessary. Further, the registration system 10 may receive an input of credit card information, communicate with a system of a credit company, and perform a payment process. In addition, the registration system 10 may transmit information for the settlement process (information indicating the registered product, the total payment amount, and the like) to another settlement apparatus. In addition, the registration system 10 may receive an input of a tendered amount tendered by a customer, compute a change amount based on the input amount, displays the change amount on the display (for example, the first display 7), or pay out the computed change amount.

The registration system 10 according to the present example embodiment described above allows, when one or a plurality of ones are selected from the products displayed on the first display 7, information (for example, the blinking mark M1 in FIG. 7) for determining the selected product to be displayed on the second display 2. Further, the product can be distinguishably displayed on the first display 7 (see FIG. 6). In this manner, by appropriately interlocking the information on checkout displayed on a plurality of displays (the first display 7 and the second display 2), the user can easily recognize his/her input contents and the like. As a result, work efficiency of a checkout process is improved.

For example, the registration system 10 according to the present example embodiment enables the user to select a product as a target of various processes such as "delete", "change quantity", "change product name", "discount process", and the like from the registered product list displayed on the first display 7. After that, the user can recognize whether or not the processing target is correctly selected, based on the display content on the first display 7 as illustrated in FIG. 6 or the display content on the second display 2 as illustrated in FIG. 7.

Further, the registration system 10 according to the present example embodiment allows the product selected from the registered product list displayed on the first display 7 to be clearly indicated on the second display 2, so that the user can easily recognize a correspondence relationship between the product placed on the second display 2 and the product in the registered product list displayed on the first display 7. Based on the recognized correspondence relationship, the user can confirm whether each product is correctly recognized by image analysis and is correctly registered.

Figure 11:
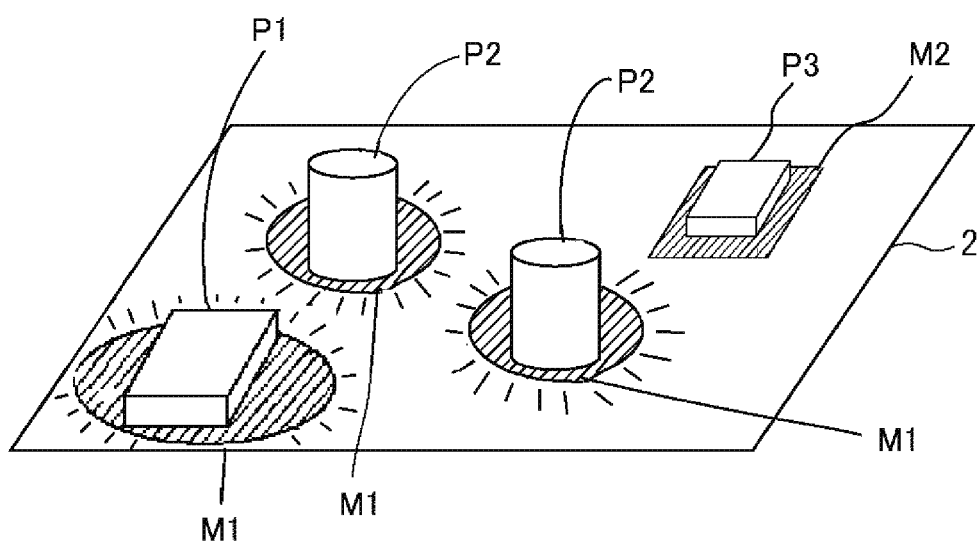
FIG. 11 is a diagram schematically illustrating still another example of the information output to the second display 2 by the registration system 10 according to the present example embodiment.

Here, a modification example of the present example embodiment will be described. The first selection unit 14 can receive the first selection input for selecting a plurality of products. Displays on the first display unit 13 and the second display unit 15 in this case are as illustrated in FIGS. 10 and 11. In the illustrated example, the products P1 (Showa chocolate bar) and P2 (soda drink (lime flavor)) are selected. In a case where the plurality of products can be selected in this manner, various processes ("delete", "change quantity", "discount process", and the like) can be performed on the plurality of products at once. As a result, work efficiency of a checkout process is improved.

Second Example Embodiment

The present example embodiment is different from the first example embodiment in that a product can be selected via the second display 2 which is a touch panel display.

An example of a hardware configuration of the registration system 10 according to the present example embodiment has the same manner as that of the first example embodiment.

Figure 12:
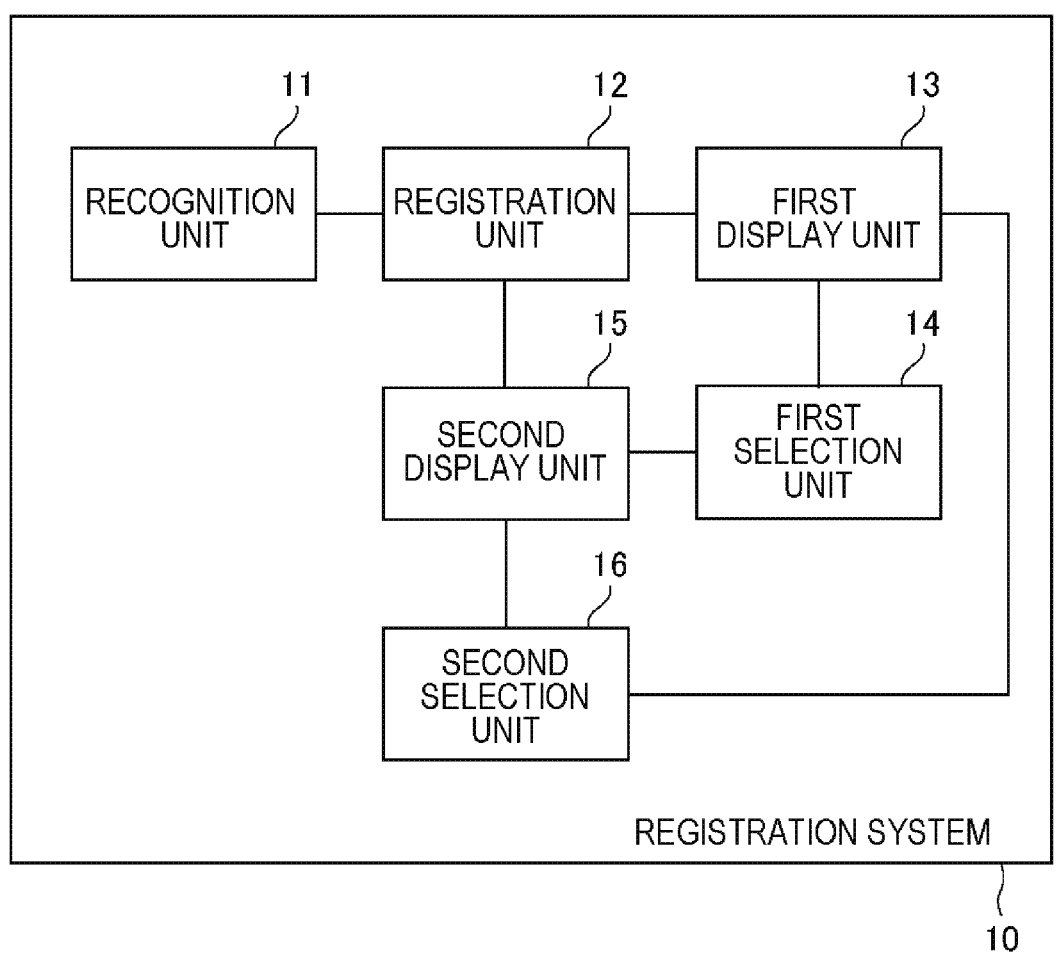
FIG. 12 is a diagram illustrating an example of a functional block diagram of the registration system 10 according to the present example embodiment.

An example of a functional block diagram of the registration system 10 is illustrated in FIG. 12. As illustrated, the registration system 10 includes the recognition unit 11, the registration unit 12, the first display unit 13, the first selection unit 14, the second display unit 15, and a second selection unit 16. Configurations of the recognition unit 11, the registration unit 12, and the first selection unit 14 have the same manner as those in the first example embodiment.

The second selection unit 16 selects one or more of products registered as checkout targets, based on a second selection input via the touch panel display (the second display 2). The first display unit 13 can display the product selected by the second selection input in the registered product list so as to be distinguished from other products (unselected products). In addition, the second display unit 15 can display information for determining the product selected by the second selection input on the second display 2.

The second selection input may be executed by an operation of tapping any one of the marks M1 in a state illustrated in FIG. 5, for example. For example, when the mark M1 of the product P1 is tapped, the second selection unit 16 may select the product P1. In response to the selection, the second display unit 15 switches a display content on the second display 2 as illustrated in FIG. 7. In the illustrated example, the first display unit 13 displays information (the blinking mark M1) which determines the product selected by the second selection input at a placement position of the product P1. Further, as illustrated in FIG. 6, the first display unit 13 can display the product selected by the second selection input (in a case of FIG. 6, "Showa chocolate bar") in the registered product list so as to be distinguished from other products (unselected products).

In this manner, not only the display content of the second display 2 but also the display content of the first display 7 can be switched according to the touch operation on the second display 2. The user can recognize the product currently selected (the operation content of the user) not only from the touch-operated display content of the second display 2 but also from the display content of the first display 7.

Other configurations of the first display unit 13 and the second display unit 15 have the same manner as those in the first example embodiment.

The registration system 10 according to the present example embodiment described above achieves the same advantageous effect as the first example embodiment. Further, the registration system 10 according to the present example embodiment in which the operation of selecting one product can be performed from the second display 2 improves the degree of freedom of the operation. As a result, work efficiency of a checkout process is improved.

Here, a modification example of the present example embodiment will be described. The second selection unit 16 can receive a second selection input for selecting a plurality of products. Displays on the first display unit 13 and the second display unit 15 in this case are as illustrated in FIGS. 10 and 11. In the illustrated example, the products P1 (Showa chocolate bar) and P2 (soda drink (lime flavor)) are selected. In a case where the plurality of products can be selected in this manner, various processes ("delete", "change quantity", "discount process", and the like) can be performed on the plurality of products at once. As a result, work efficiency of a checkout process is improved.

Third Example Embodiment

The registration system 10 according to the present example embodiment is different from the first and second example embodiments in that a product satisfying a predetermined condition is selected from a registered product list and distinguishably displayed.

An example of a hardware configuration of the registration system 10 according to the present example embodiment has the same manner as that of the first and second example embodiments.

An example of a functional block diagram of the registration system 10 is illustrated in FIG. 2 or 12. As illustrated, the registration system 10 includes the recognition unit 11, the registration unit 12, the first display unit 13, the first selection unit 14, and the second display unit 15, and may further include the second selection unit 16. Configurations of the recognition unit 11, the registration unit 12, the first display unit 13, the second display unit 15, and the second selection unit 16 have the same manner as those in the first and second example embodiments.

The first selection unit 14 selects a product satisfying a predetermined condition from a registered product list. The first display unit 13 can display the product selected by the first selection unit 14 in the registered product list so as to be distinguished from other products (unselected products) (see FIG. 6). In addition, the second display unit 15 can display information for determining the product selected by the first selection unit 14 on the second display 2 (see FIG. 7).

The predetermined condition is "discount-processed product", "product of which a use by date/best by date is expired", "product is a target for receiving benefits such as discounts when a predetermined number or more products are purchased at a time, but the number of purchases does not satisfy the condition", "target product for which the purchaser will receive a free gift", "product with purchase restrictions (age, number, and the like)", or the like.

By selecting and distinguishably displaying "discount-processed product" on the second display 2 and the first display 7, the user can recognize that the product to be discounted is certainly discounted. Note that, the first display unit 13 and the second display unit 15 may further display information indicating that the selected product is the "discount-processed product".

By selecting and distinguishably displaying "product of which a use by date/best by date is expired" on the second display 2 and the first display 7, it is possible to alert the user that the product of which use by date/best by date is expired is purchased/sold. Note that, the first display unit 13 and the second display unit 15 may further display information indicating that the selected product is "product of which a use by date/best by date is expired".

Here, an example of a means which determines a use by date/best by date of each product will be described. For example, a code (a bar code, a two-dimensional code, and the like) attached to each product may indicate the use by date/best by date of each product. The recognition unit 11 may recognize the use by date/best by date of each product by detecting the code of each product included in the image by image analysis and analyzing a pattern of the detected code.

By selecting and distinguishably displaying "product is a target for receiving benefits such as discounts when a predetermined number or more products are purchased at a time, but the number of purchases does not satisfy the condition" on the second display 2 and the first display 7, the user can recognize the situation, that is, "a situation in which the user is about to purchase a product for benefits but cannot receive the benefits at the present time since the number of products does not satisfy the condition". As a result, it is possible to take measures such as increasing the number of purchases so that the customer receives the benefit. Note that, the first display unit 13 and the second display unit 15 may further display information indicating that the selected product is the "product which is a target for receiving benefits such as discounts when a predetermined number or more products are purchased at a time, but the number of purchases does not satisfy the condition". Further, the first selection unit 14 may compute a difference between the number registered as the checkout target and the number for receiving the benefit. The first display unit 13 and the second display unit 15 may display a guide that "you can receive benefits of ∘∘ if you purchase more ∘∘ pieces".

For example, benefit condition information indicating a condition of a target product and the number of purchases to which the benefit is given when the number of purchases satisfies the condition may be registered in advance. The first selection unit 14 can recognize the condition of the target product or the number of products for the benefit based on the benefit condition information.

By selecting and distinguishably displaying a "target product for which the purchaser will receive a free gift" on the second display 2 and the first display 7, the user can recognize the situation, that is, "situation in which the target product for which the purchaser will receive a free gift is purchased. As a result, it is possible to receive and give away the free gift without forgetting. Note that, the first display unit 13 and the second display unit 15 may further display information indicating that the selected product is the "target product for which the purchaser will receive a free gift". In addition, the first display unit 13 and the second display unit 15 may display information on how to receive the free gift.

For example, benefit information indicating a target product for which the purchaser will receive a free gift may be registered in advance. The first selection unit 14 can recognize the target product for the benefit based on the benefit information.

By selecting and distinguishably displaying "product with purchase restrictions (age, number, and the like)" on the second display 2 and the first display 7, the user can recognize the situation, that is, "the situation in which a product with purchase restrictions (age, number, and the like) is purchased". As a result, it is possible to suppress the inconvenience of selling the product to a customer who does not satisfy the age condition or selling the product exceeding an upper limit of purchase. Note that, the first display unit 13 and the second display unit 15 may further display information indicating that the selected product is the "product with purchase restrictions (age, number, and the like)". Further, the first display unit 13 and the second display unit 15 may display information of "Are you ○○ or older? Yes/No", and the first selection unit 14 may receive an input of the answer.

For example, purchase restriction information indicating a product with purchase restrictions (age, number, and the like) may be registered in advance. The first selection unit 14 can recognize the product with the purchase restrictions (age, number, and the like) based on the purchase restriction information.

Note that, as described in the first and second example embodiments, in a case where the first selection unit 14 selects a product based on a first selection input or a second selection input by a user, the first display unit 13 can display information for specifying the processing content as illustrated in FIG. 6. On the other hand, in a case where the first selection unit 14 selects the "product satisfying a predetermined condition" as in the present example embodiment, the first display unit 13 may not display the information for specifying the processing content as illustrated in FIG. 6. That is, the product satisfying the predetermined condition may not be selected to execute a predetermined process, but may be selected to clearly indicate that the predetermined condition is satisfied.

The registration system 10 according to the present example embodiment described above allows the same advantageous effect as the first and second example embodiments to be achieved. Further, the registration system 10 according to the present example embodiment makes it possible to clearly indicate the product satisfying the condition. For example, "discount-processed product", "product of which a use by date/best by date is expired", "product which can receive benefits such as discounts if you purchase a certain number or more at a time, but the number of purchases does not satisfy the condition", "target product for which the purchaser will receive a free gift", "product with purchase restrictions (age, number, and the like)", or the like can be clearly indicated. As a result, the user can recognize that these products are to be purchased. As a result, it is possible to avoid various inconveniences caused by overlooking that these products are to be purchased.

Here, a modification example applicable to all the example embodiments will be described. In the modification example, the registration system 10 may not have the second display 2. In this case, the second display unit 15 can display the information displayed on the second display 2 in the above-described example embodiments, on a placing surface of the placing table 1 by using a projection apparatus.

The second display unit 15 holds in advance a conversion rule for converting "coordinates of an image" into the "coordinates of a projection area of the projection apparatus". The second display unit 15 can convert a position (the coordinates) of an object in the image into the coordinates of the projection area of the projection apparatus based on the conversion rule and project predetermined information to surround the converted position or be close to the position, for example. The coordinates of the projection area of the projection apparatus are represented by a coordinate system in which any position is defined as an origin and any directions are defined as an x-axis direction and a y-axis direction in the projection area.

The second selection unit 16 receives various inputs (product selection and the like) based on a gesture (for example, movement, a shape, a position, and the like of a hand) of a person imaged by the camera 4.

Hereinafter, appendixes to examples of reference forms will be added.

1. A recognition system including a recognition unit that analyzes an image obtained by a camera imaging a placing surface of a table on which a product is placed and recognizes the product in the image;

a registration unit that registers the recognized product as a checkout target;

a first display unit that displays a list of the products registered as the checkout targets on a display;

a first selection unit that selects one or more of the products from the list; and a second display unit that displays information for determining the selected product, on the placing surface.

2. The registration system according to appendix 1, in which the first selection unit selects the product based on a first selection input for selecting one or more of the products from the list.

3. The registration system according to appendix 1, in which the first selection unit selects the product satisfying a predetermined condition from the list.

4. The registration system according to any one of appendixes 1 to 3, in which the table is a touch panel display, and a display surface of the touch panel display is the placing surface, the registration system further including a second selection unit that selects one or more of the products, based on a second selection input via the touch panel display, and the first display unit distinguishably displays the product selected based on the second selection input in the list.

5. A registration method executed by a computer, the method including:

a recognition step of analyzing an image obtained by a camera imaging a placing surface of a table on which a product is placed and recognizing the product in the image;

a registration step of registering the recognized product as a checkout target;

a first display step of displaying a list of the products registered as the checkout targets on a display;

a first selection step of selecting one or more of the products from the list; and a second display step of displaying information for determining the selected product on the placing surface.

6. A program causing a computer to function as:
a recognition unit that analyzes an image obtained by a camera imaging a placing surface of a table on which a product is placed and recognizes the product in the image;
a registration unit that registers the recognized product as a checkout target;
a first display unit that displays a list of the products registered as the checkout targets on a display;
a first selection unit that selects one or more of the products from the list; and
a second display unit that displays information for determining the selected product on the placing surface.

This application claims priority based on Japanese Patent Application No. 2018-054101 on Mar. 22, 2018, the disclosure of which is incorporated herein in its entirety.

The invention claimed is:
1. A registration system comprising:
at least one memory configured to store instructions; and
at least one processor configured to execute the instructions to:
recognize a product in an image captured by a camera including a placing surface of a table on which the product is placed, wherein the table is a touch panel display, and a display surface of the touch panel display is the placing surface;
register the recognized product as a checkout target;
display a list of registered products on a first display, wherein the first display is different from the touch panel display;
display marks on the touch panel display, wherein each of the marks are displayed at placement positions of each of the registered products;
receive a first input to select one or more registered products from the list, and select one or more of the registered products from the list based on the first input;
highlight one or more of the marks displayed at placement positions of the registered products selected based on the first input, in case the first input is received;
receive a second input, via the touch panel display, to select one or more of the marks, and select one or more of the registered products placed at positions in which the selected marks are displayed; and
highlight, in the list displayed on the first display, one or more of the registered products selected based on the second input, in case where the second input is received.
2. The registration system according to claim 1, wherein the at least one processor is configured to:
select the product based on a first selection input for selecting one or more of the products from the list.
3. The registration system according to claim 1, wherein the at least one processor is configured to:
select the product satisfying a predetermined condition from the list.
4. The registration system according to claim 3, wherein the predetermined condition is discount-processed product.
5. The registration system according to claim 3, wherein the predetermined condition is product of which a use by date or best by date is expired.
6. The registration system according to claim 3, wherein the predetermined condition is target product for which the purchaser will receive a free gift.

7. The registration system according to claim 3, wherein the predetermined condition is product with purchase restrictions.
8. The registration system according to claim 1, wherein the at least one processor is configured to:
determine a position on the placing surface of the selected products based on the image; and
display the information on a position of a second display corresponding to the determined position, the second display being installed on the placing surface.
9. The registration system according to claim 1, wherein the at least one processor is configured to:
determine a position of the recognized product on the placing surface based on the image;
display a first mark on a position of a second display corresponding to the determined position; and
display a second mark as the information on the position of the selected product by replacing the first mark.
10. The registration system according to claim 1, wherein the first mark and the second mark are distinguished from each other by a difference in feature.
11. A registration method executed by a computer, the method comprising:
recognizing a product in an image captured by a camera including a placing surface of a table on which the product is placed, wherein the table is a touch panel display, and a display surface of the touch panel display is the placing surface;
registering the recognized product as a checkout target;
displaying a list of registered products on a first display, wherein the first display is different from the touch panel display;
displaying marks on the touch panel display, wherein each of the marks are displayed at placement positions of each of the registered products;
receiving a first input to select one or more registered products from the list, and selecting one or more of the registered products from the list based on the first input;
highlighting one or more of the marks displayed at placement positions of the registered products selected based on the first input, in case the first input is received;
receiving a second input, via the touch panel display, to select one or more of the marks, and select one or more of the registered products placed at positions in which the selected marks are displayed; and
highlighting, in the list displayed on the first display, one or more of the registered products selected based on the second input, in case where the second input is received.
12. A non-transitory storage medium storing a program causing a computer to:
recognize a product in an image captured by a camera including a placing surface of a table on which the product is placed, wherein the table is a touch panel display, and a display surface of the touch panel display is the placing surface;
register the recognized product as a checkout target;
display a list of registered products on a first display, wherein the first display is different from the touch panel display;
display marks on the touch panel display, wherein each of the marks are displayed at placement positions of each of the registered products;
receive a first input to select one or more registered products from the list, and select one or more of the registered products from the list based on the first input;

highlight one or more of the marks displayed at placement positions of the registered products selected based on the first input, in case the first input is received;

receive a second input, via the touch panel display, to select one or more of the marks, and select one or more of the registered products placed at positions in which the selected marks are displayed; and highlight, in the list displayed on the first display, one or more of the registered products selected based on the second input, in case where the second input is received.

\* \* \* \* \*